US012254268B2

(12) United States Patent
Maurya et al.

(10) Patent No.: US 12,254,268 B2
(45) Date of Patent: *Mar. 18, 2025

(54) QUALITY AND EFFICACY ANALYSIS OF STATEMENT OF PURPOSE IN HIGHER EDUCATION ADMISSIONS USING MACHINE LEARNING

(71) Applicant: iSchoolConnect, Inc., Marlborough, MA (US)

(72) Inventors: Himanshu Maurya, Jaunpur (IN); Atul Verma, Jaipur (IN); Ashish Shriram Tulsankar, Mumbai (IN); Ashish Fernando, Draper, UT (US)

(73) Assignee: iSchoolConnect, Inc., Marlborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/648,446

(22) Filed: Apr. 28, 2024

(65) Prior Publication Data

US 2024/0281607 A1    Aug. 22, 2024

Related U.S. Application Data

(63) Continuation of application No. 17/453,416, filed on Nov. 3, 2021, now Pat. No. 11,972,209.

(51) Int. Cl.
*G06F 40/253* (2020.01)
*G06F 18/2433* (2023.01)
*G06N 20/00* (2019.01)

(52) U.S. Cl.
CPC ........ *G06F 40/253* (2020.01); *G06F 18/2433* (2023.01); *G06N 20/00* (2019.01)

(58) Field of Classification Search
CPC .... G06F 40/253; G06F 18/2433; G06N 20/00
See application file for complete search history.

(56) References Cited

U.S. PATENT DOCUMENTS

| 11,816,573 B1* | 11/2023 | Garvey | G06F 40/279 |
| 2015/0324330 A1* | 11/2015 | Bryant | G09B 5/00 434/169 |
| 2020/0250562 A1* | 8/2020 | Bly | G06F 18/285 |

FOREIGN PATENT DOCUMENTS

| JP | 4625178 B2 * | 2/2011 | G06F 17/274 |
| WO | WO-02059857 A1 * | 8/2002 | G06F 17/274 |
| WO | WO-2005045695 A1 * | 5/2005 | G06F 17/274 |

* cited by examiner

*Primary Examiner* — Mohammad K Islam
(74) *Attorney, Agent, or Firm* — Thomas Oakley PLLC

(57) ABSTRACT

Systems and methods for the multifaceted analysis of a written work, such as an educational program admission essay, using machine learning, deep learning and natural language processing. Language, relevance, structure, and flows are evaluated for an overall impactful essay. Essay content is checked to evaluate whether the author has covered an essay's essential aspects. The essay is also analyzed for an effective structure for presenting details as per the essay type. The disclosure includes data preparation for the task, process of data tagging, feature engineering from the essay text, method for transfer learning and fine-tuning language model to adapt to the context of an essay. Finally, a process for building machine learning and deep learning models and technique for ensembling to use both models in combination is disclosed. The system may provide user-adapted feedback based on a persona created from the user profile.

20 Claims, 13 Drawing Sheets

| From/To | TITLE | INTRODUCTION | PREDICAMENT | MAIN_IDEA | SUPPORTING_IDEA | CONCLUSION | SUPPORTING_CONCLUSION | OTHERS |
|---|---|---|---|---|---|---|---|---|
| TITLE | -0.218 | 1.598 | 1.52 | -0.117 | 0 | -0.094 | 0 | 0 |
| INTRODUCTION | -1.31 | 2.148 | 2.101 | 5.75 | -0.902 | -1.515 | -0.497 | -0.372 |
| PREDICAMENT | -1.122 | 2.092 | 0.001 | 6.676 | 1.417 | 0.975 | -0.63 | -0.571 |
| MAIN_IDEA | -0.24 | -3.003 | -2.94 | 4.439 | 7.985 | 2.947 | 3.717 | -0.692 |
| SUPPORTING_IDEA | -1.928 | -3.372 | -4.009 | 5.521 | 4.076 | 3.6 | 4.671 | 0.286 |
| CONCLUSION | -4.503 | -6.083 | -6.868 | -3.168 | -3.324 | -2.491 | -3.827 | -2.252 |
| SUPPORTING_CONCLUSION | -0.914 | -2.428 | -3.192 | 4.112 | -0.364 | 3.639 | 1.618 | -0.344 |
| OTHERS | -1.167 | -1.32 | -1.372 | -0.73 | -0.003 | 0.285 | -0.434 | 2.769 |

FIG. 9

FIG. 10

QUALITY AND EFFICACY ANALYSIS OF STATEMENT OF PURPOSE IN HIGHER EDUCATION ADMISSIONS USING MACHINE LEARNING

I. PRIORITY CLAIM

The present invention is a continuation of, and claims priority from, U.S. patent application Ser. No. 17/453,416, the disclosure of which is hereby incorporated by this reference in its entirety.

II. FIELD OF INVENTION

The invention disclosed herein is related to the machine learning-based analysis of essays and statements of purpose submitted for higher education admissions, and also other types of written content. More specifically, the invention relates to the evaluation of overall language quality, content quality, and structure of an essay or other written content.

III. BACKGROUND OF THE INVENTION

One of the most important and standard application requirements for admission to higher education study programs is a Statement of Purpose (SOP) and/or an admissions essay (collectively referred to in this document as an "essay"). A strong essay communicates to the admissions committee or faculty, the applicant's knowledge, experience, motivation, and intellectual maturity as related to the applicant's target program at the institution. An essay enables the admissions committee to assess the readiness of the applicant in pursuing education at a given institution and can be a decisive factor in determining whether an applicant is accepted or rejected, independent of other qualifications.

Applicants, especially those applying for study abroad programs, often find themselves at a disadvantage regarding knowledge of appropriate content quality, language, and structure for an overall impactful essay to an international institution. These individuals often lack the guidance required to ensure that the right content is included within their essay. An effective essay includes certain key details surrounding the individual. However, a human may not be available to advise the applicant as and when needed. A machine-learning-based computer application capable of assessing these important judgmental aspects of an essay through natural language understanding can be used to evaluate the quality and efficiency of such a document and make appropriate recommendations, or even score a submitted essay.

While the technology of this invention is often described herein with respect to analysis of an essay specifically, persons skilled in the relevant art will recognize that the instant invention is also applicable to other types of written products more generally. The same problems exist for many types of written work products in other circumstances and the same principles disclosed herein may be applied to, for example, admissions essays for undergraduate education or at any other level, TOEFL or GRE essays, news articles, press releases, grant applications, formal letters or workplace communications, regulatory filings, and many others. The techniques herein disclosed may also be used to evaluate a spoken interview. In that use case, a video of an applicant or interviewee is processed to convert text to speech. The resulting text may then be processed according to the principles of this invention to assess the content and quality of the interviewee's answers as well as their English proficiency. Such use cases include the speaking portion of the TOEFL or IELTS assessments.

IV. BRIEF SUMMARY OF THE INVENTION

The objective of the invention disclosed herein is to provide a mechanism—referred to herein as the Essay Analyzer—to analyze, rate, and provide feedback on an essay used for higher education admissions or other written work product. Based on the rating (which is a scaled score) generated for each essay, the Essay Analyzer can generate suggestions on improvements that can be made to the essay. In some embodiments, the tool provides only suggestions and does not alter the essay text itself.

V. BRIEF DESCRIPTION OF THE DRAWINGS

FIG. 2 illustrates a screenshot of the user interface showing the content analysis section of Essay Analyzer.

FIG. 4 illustrates a screenshot of the user interface displaying a profile section of the Essay Analyzer.

FIG. 5 illustrates a screenshot of the user interface demonstrating collection of seed information in Essay Analyzer.

FIG. 6 illustrates a screenshot of the user interface showing the analysis, rating, and suggested feedback for improvement of the SOP.

FIG. 9 illustrates an exemplary discourse structure matrix which can be used in the disclosed invention.

FIG. 10 illustrates a screenshot of the user interface showing the language analysis section of the Essay Analyzer.

VI. DETAILED DESCRIPTION

Embodiments of the present invention will be described below in detail with reference to the accompanying figures.

A. Overview

Figure 1:
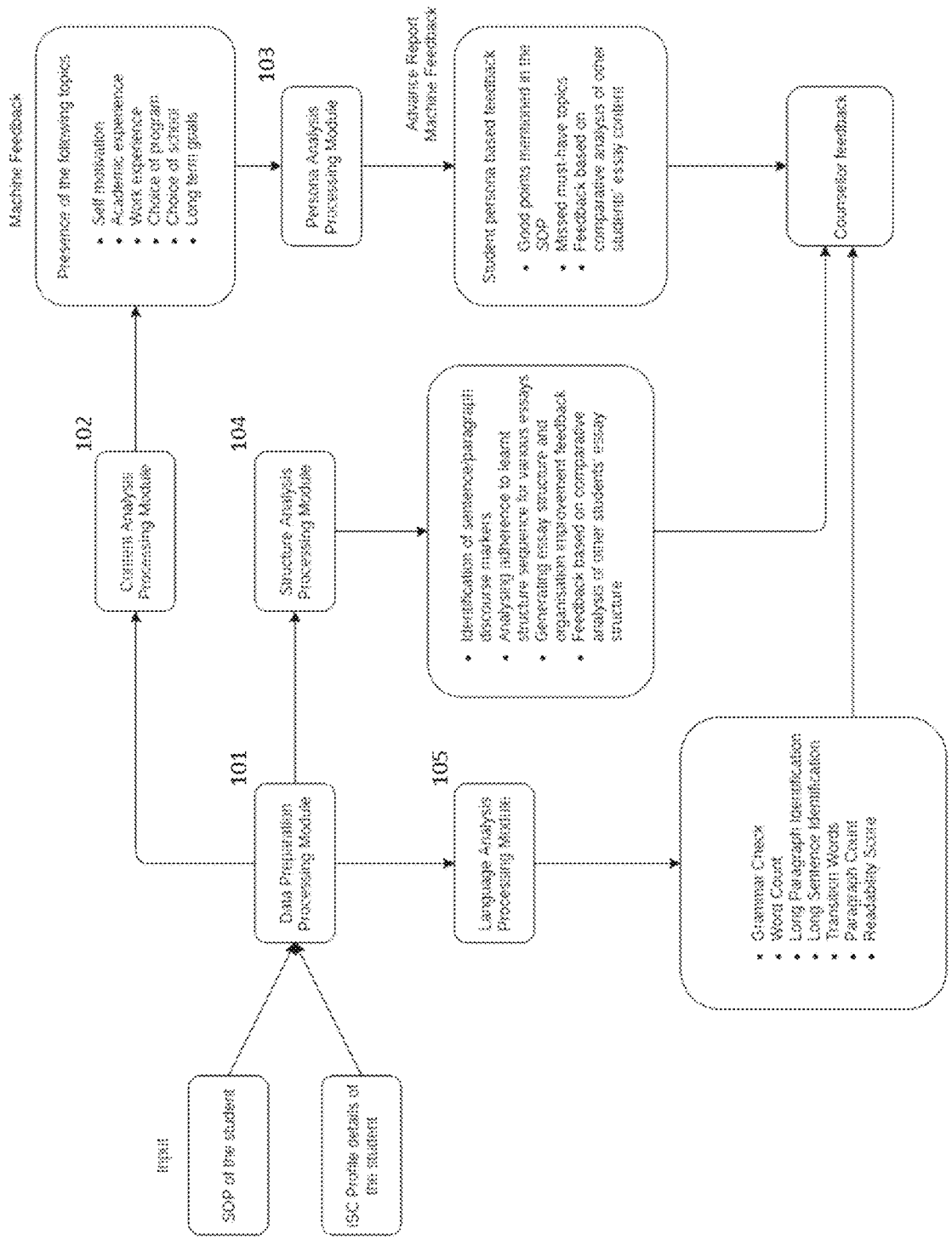
FIG. 1 shows a schematic representation of a framework for the Essay Analyzer in one embodiment.

FIG. 1 shows a framework for the Essay Analyzer in one embodiment. Essay Analyzer is an intelligent framework, which uses natural language processing and machine learning for the complete analysis of an essay or other written or spoken composition, required for higher education admissions.

The framework analyzes the language, relevance, structure, and flows for an overall impactful essay. The framework checks the essay for grammatical and language-related mistakes and guides the author to rectify. Essay content is checked to evaluate whether the author has covered essential aspects regarded primary to the essay that are pre-identified in the framework.

As shown in FIG. 1, input to the Essay Analyzer includes the essay (or other written content, in this case a document type SOP), and a profile for the essay, which in this case is a persona of the applicant author. The Data Preparation and Processing Module 101 takes the input and performs pre-processing tasks to format the essay and profile information for passing on to the Content Analysis Processing Module 102, the Persona Analysis Processing Module 103, the Structure Analysis Processing Module 104, and the Language Analysis Processing Module 105.

For example, the Data Preparation and Processing Module 101 parses and stores input data as more specifically described in Section F.3.b below. The Content Analysis Processing Module 102 detects the presence (and absence) of topics that are expected to be in an effective essay. The Persona Analysis Processing Module 103 analyzes the essay for content that is specific and tailored to the profile information for that particular essay in a manner that would not be expected from all essays. The Structure Analysis Processing Module 104 assesses the structure of the essay by classifying parts of the essay from a list of discourse elements and analyzing the sequence of discourse elements. The Language Analysis Processing Module 105 performs an assessment of the language usage within the essay. Processing modules 102-105 are explained in more detail below.

The framework may create a customizable profile for the essay, which in the context of the above sample consists of a persona for the applicant based on the profile of the applicant. In other contexts, this profile could include information specific to the essay. For example, in the case of a regulatory filing, the profile would include information about the relevant regulatory body with whom the filing is to be made; in the case of an article, the profile could include information about the publication and target audience. The Essay Analyzer may then compare and benchmark the essay profile with other profiles for similar work stored in a database. In the case of an SOP, the current applicant's SOP profile is compared with historical applicants SOP profiles recorded in the database. It then provides analysis and feedback as per the profile or identified persona. The framework points to whether there is an issue with the flow in the information presented compared to the flow of well-written essays it retrieves from the database.

The author may continue to write and evaluate (or reword and re-record, in the case of a spoken product) the essay further on a user interface and can receive immediate revised analysis and feedback from the system. The process may iterate until the author finds the essay satisfactory for submission. Optionally, the essay may be forwarded to a human reviewer who does a quality check of the essay and provides detailed human-level feedback either as part of this iterative refinement or at the end of the refinement process.

B. Content Analysis Processing Module

The author submitted essay text is fetched from the database by a Content Analysis Processing Module 102 and further analyzed to identify various aspects or topics of an essay that are recommended to be present in an effective and complete essay of the selected type (such as an SOP). The composition of various identified topics, along with the comparative analysis of those topics is provided to authors. This feedback helps caution the author in case they are writing too much about a particular topic.

Figure 2:
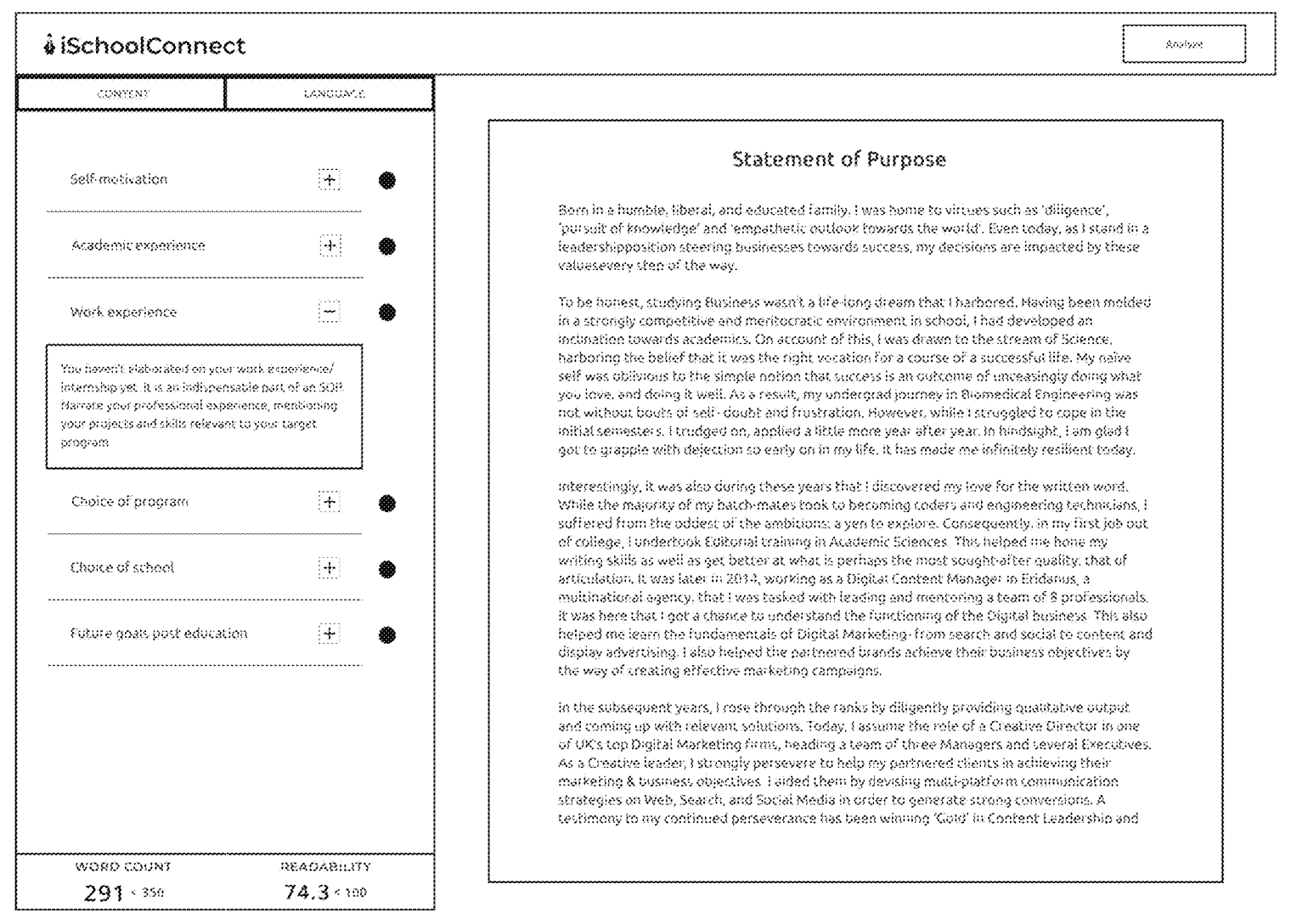

One exemplary implementation of the user interface for the Content Analysis Processing Module is illustrated through a screenshot of a display showing the content analysis section of the Essay Analyzer in FIG. 2. The essay appears in a main content panel on the right side of the screen. Feedback regarding various content types appear at left. An indicator next to each content type reflects the assessment for that content type—i.e., too much, too little, or a good amount of content. The interface may provide additional context and feedback for each content type.

In the context of an SOP, the following are some of the major topics, also referred to herein as "classes", (but not limited to these alone) the presence of which are identified in the Essay Analyzer:
  Self-motivation
  Work experience
  Academic experience
  Choice of program
  Choice of the school
  Future goals post-education 1. Machine Learning for Detecting and Classifying Topics The Content Analysis Processing Module uses machine learning, deep learning, and natural language processing for the content analysis of the essay. The problem of detecting of multiple topics covered in an SOP is a multilabel classification problem. Such problems often require a large volume of training data to generate a useful model. In some applications, there may be less data available than necessary or desirable for training. For example, to illustrate the inherent scarcity of quality data, at one point during development of this invention, despite having had 250 SOPs consisting of about 2,000 paragraphs, only about 550 paragraphs were able to be tagged.

a. Transfer Learning/Fine-Tuning

Under these circumstances, transfer learning can be used to compensate for the shortage of data. In this particular example, for transfer learning, the WikiText Long Term Dependency Language Modeling Dataset (Wikitext-103) may be used to train a language model using the Universal Language Model Fine-tuning (ULMFIT) algorithm.

First, the language model is trained—for example, ULMFiT trained on Wikitext-103 dataset. ULMFiT is an encoder-decoder architecture, with language model as encoder head and classifier as the decoder head. The encoder head is kept as is and the decoder head is dropped from the pre-trained model. A multi-label classification decoder head is then added to the model.

b. Training (Multilabel)

The multilabel training process may advantageously be performed with the following exemplary hyper-parameters: a Binary Cross Entropy with Logits loss function; Adam Optimizer as the optimizer; 10 epochs; and learning rates/dropouts per layer of 1E-4/0.2, 1E-4/0.25, 1E-4,/0.025 1E-3/0.15, 1E-2/0.2.

To begin the procedure, first, the pre-trained model trained using ULMFiT as mentioned above is loaded. The vocabulary common in the pre-trained model and vocabulary of the dataset alone are loaded for further finetuning. The words that are not in the pre-trained model but present in the vocabulary are initialized with the average of embeddings of the rest of the words. This smaller pre-trained model is further tuned so that the embeddings adapt to the domain of essay documents.

Once finetuned, the decoder is removed from the model, and the encoder is saved. At this point, the encoder contains word embeddings/language model, which will be further used to train the end-to-end model. A new decoder head (multi-label), specifically a PoolingLinearClassifier is added to the model. Now, this complete model is trained end-toend with the above-specified hyperparameters to result in a model for identifying classes (or topics) present in a given paragraph.

c. Machine Learning (Stacked Ensemble) Multiclass

Model features include the following:

Tense Word Count: Number of past, present, and future tense words present in the paragraph Objects lexical proportions: Given a tagged class, we create a dictionary or set of keywords that are found in that topic/class. Object lexical proportions are the ratio of all the objects present in a given paragraph to all the objects present in the training set of our tagged data.

Verbs lexical proportions: Given a tagged class, we create a dictionary or set of keywords that are found in that topic/class. Verbs lexical proportions are the ratio of all the objects present in a given paragraph to all the objects present in the training set of our tagged data.

TF-IDF: The TF-IDF is the product of two statistics, term frequency, and inverse document frequency. There are various ways of determining the exact values of both statistics. A formula that aims to define the importance of a keyword or phrase within a document Deep Learning Model Output: Since the machine learning model is a stacked ensemble model, it uses signal/output from the deep learning model and uses them as a feature for training machine learning model.

Figure 3:
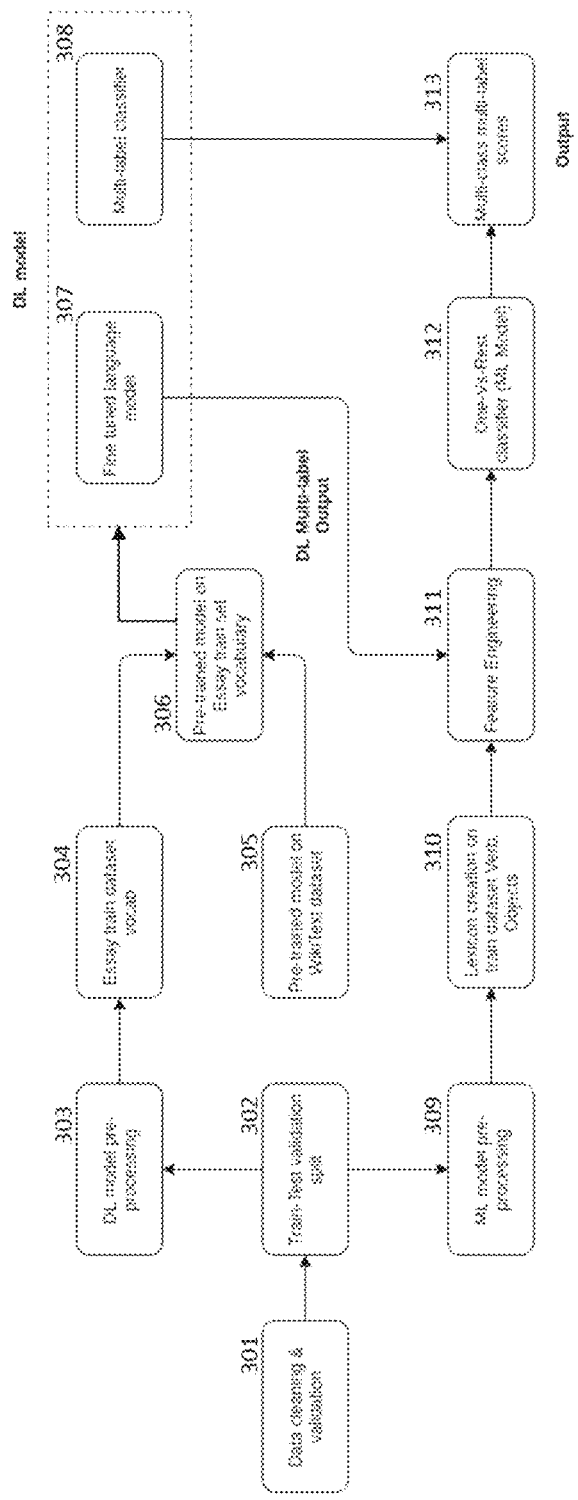
FIG. 3 shows a flow chart for training the Content Analysis Processing Model in an exemplary embodiment.

FIG. 3 shows a flow chart for training the Content Analysis Processing Model in an exemplary embodiment. In step 301, input data is cleaned and validated for use in training and testing. In step 302, the cleaned and validated input data is split into a training set and a testing/validation set. In step 303, the data is preprocessed for use with a deep learning model. In step 304, a vocabulary of the input dataset is extracted. In step 305, which may be performed within or outside the scope of the Essay Analyzer training process, a language model is trained on a general-purpose text data set. In step 306, the vocabulary of the input dataset is applied to the pre-trained model. At step 307, the output of step 306 yields a language model fine-tuned to the Essay Analyzer application. At step 308, a multi-label classification decoder head is added to complete the deep learning model. At step 309, the cleaned and validated input data is preprocessed for use with the multi-label model. At step 310, a lexicon is created from the training dataset. At step 311, the fine-tuned language model and the lexicon resulting from step 310 are used to extract features that best represent and differentiate the various topics. At step 312, a one-versus-rest classifier is trained on the features from step 311. At step 313, the one-versus-rest classifier from step 312 and multi-label classifier from the deep learning model in step 308 are combined to yield the final model for classifying essay content in the Content Analysis Processing Model.

The models disclosed herein represent an exemplary embodiment of the instant invention. Other models may be employed without departing from the spirit or scope of the invention.

2. Essay Composition Assessment and Scoring

In one embodiment, the Content Analysis processing module assigns an essay composition score to the essay. An essay's composition is the proportion of an essay that is composed by a particular class. A good SOP, for example, should cover multiple aspects of the applicant's profile and state their motivation, hence multiple classes should be present in an SOP, in varying proportions.

If a topic is present in extreme proportion when compared to other topics, that topic can impact the essay in a negative way. Thus, it is imperative that all topics are present in a balanced proportion.

The following equation may be used to evaluate the composition score of class i:

$$CS_i = \frac{\log\left(\sum_{\forall x \in CI_i} LP_x\right)}{\log\left(\sum_{\forall x \in P} LP_x\right)} \times \frac{n(CI_i)}{\sum_{\forall x \in C} n(CI_x)}$$

where

C=Set of all classes in an essay

P=Set of all paragraphs in an essay $CI_i$=Set of all paragraphs where class i is present $LP_i$=Length of it paragraph of essay $CS_i$=Composition score of class i $n(CI_i)$=Total number of paragraphs where Class i is present The composition score is normalized as follows:

$$CSN_i = \frac{CS_i}{\sum_{x \in C} CS_x}$$

where $CSN_i$=Normalized composition score of class i

The essay composition score may be calculated for all available essays of a given type. The Essay Analyzer may advantageously track the distribution of these compositions across classes from the database for various essays, and in conjunction with the associated profile, provide feedback that helps the author tailor the content of the essay for better effect or to meet specific requirements, such as omitting some details to ensure the essay is within a word limit.

The Content Analysis processing module may provide immediate feedback while the author is writing the essay.

3. Essay Prompt Identification

In some embodiments, the Content Analysis Processing Module may contain multiple analysis models, which may be tailored to a particular type of written work or essay. For example, in the academic context, a prospective application may be asked to write not only a SOP, but also respond to a particular essay prompt, such as "Discuss how your academic experience and achievements have prepared you to study at our institution." A similar prompt could call for information about the applicant's professional or general life experience.

In these embodiments, a threshold model analyzes and classifies the essay prompt among the various candidate types of prompt. The Content Analysis Processing Module may then route the essay to a content analysis model that is optimized and tailored to recognize the appropriate content, in response to that particular prompt. Each model is trained as described above except that the training data is specific to the target prompt.

This approach may be generalized for other types of written works such that a plurality of models is implemented to handle content analysis outside of the academic admissions context.

C. Profile Analysis Processing Module

Creation of a Profile

The system may give more tailored feedback to the author if information regarding the essay is provided. In the SOP context, the most important information about the essay relates to the applicant himself or herself. In that context, the profile is referred to herein as a "persona." However, the information stored in a profile for other types of essays may be different. For example, if the essay to be evaluated is a journal article, the profile would include information regarding the journal and the intended audience.

Figure 4:
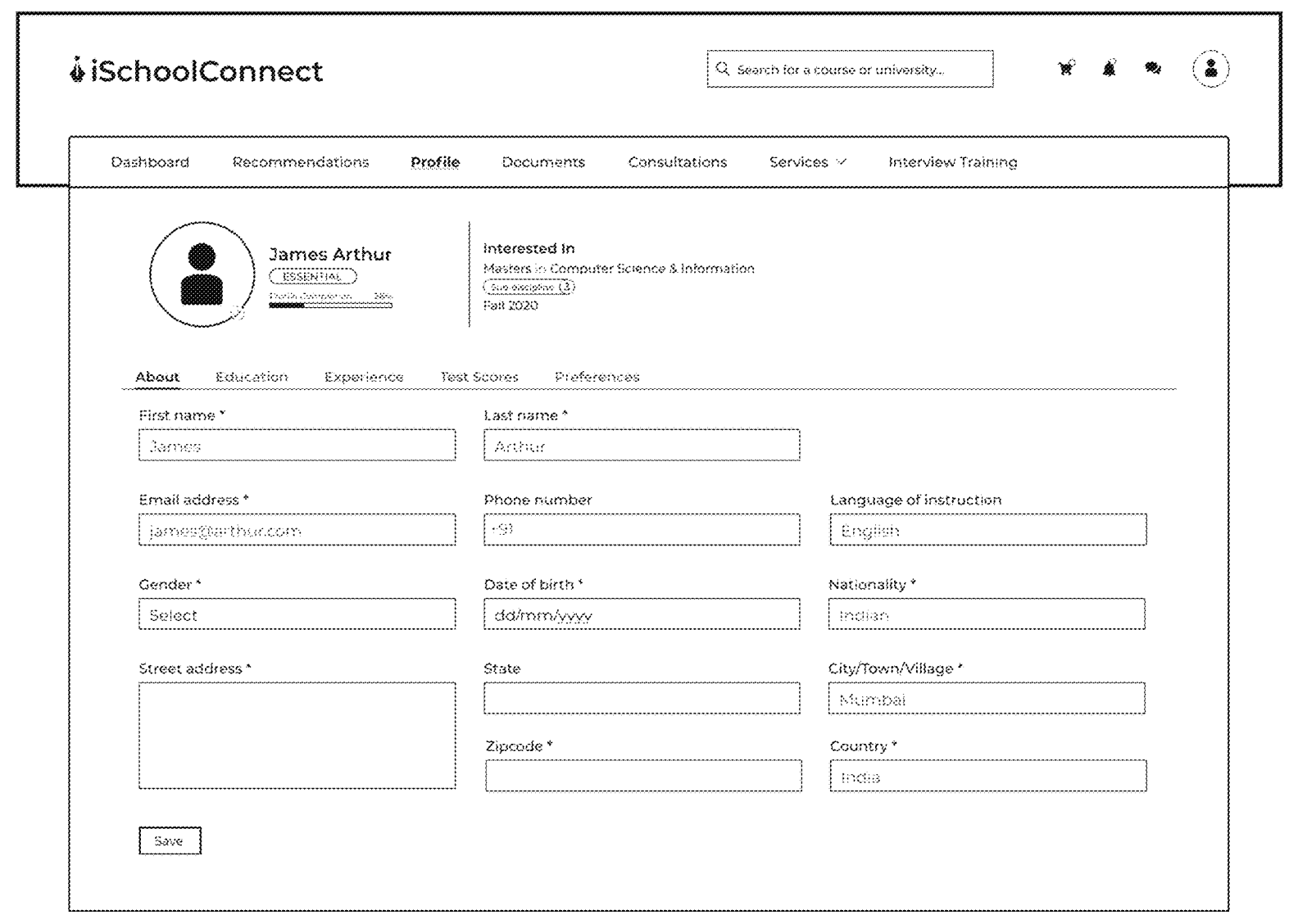

In the SOP context, an applicant preferably creates a profile in the system—a persona—by entering information about themselves into an input form displayed on the user interface. FIG. 4 shows an exemplary implementation of the input form where various input options are provided for an applicant to enter their profile details, which are understood as characteristics of the applicant.

The information captured and stored in the applicant's persona includes characteristics of the applicant relevant to the content of the SOP. For example, in the admissions context, information about the applicant's life experience, academic experience, and professional experience are useful to assess the content of the SOP.

In one embodiment, the persona includes the following fields, which are helpful for an accurate evaluation of written content within the Essay Analyzer:

Basic Information (Name, Address, Date of Birth, etc.)
Education Details (High School, Secondary, Undergraduate, etc.)
Search Preference (Budget, Country, Target Field of Study, etc.)
Test Scores (GRE, TOEFL, GMAT, etc.)
Documents (Transcripts, Degree, etc.)

In addition to the above-mentioned input, the Essay Analyzer may prompt the user through a web form to answer additional questions to gather "seed" information, which will be useful in analyzing the SOP such as:

How much is your overall work experience?
Do you have work experience relevant to your chosen field of study?
Do you plan on switching your career?
What degree do you plan on pursuing?

Figure 5:
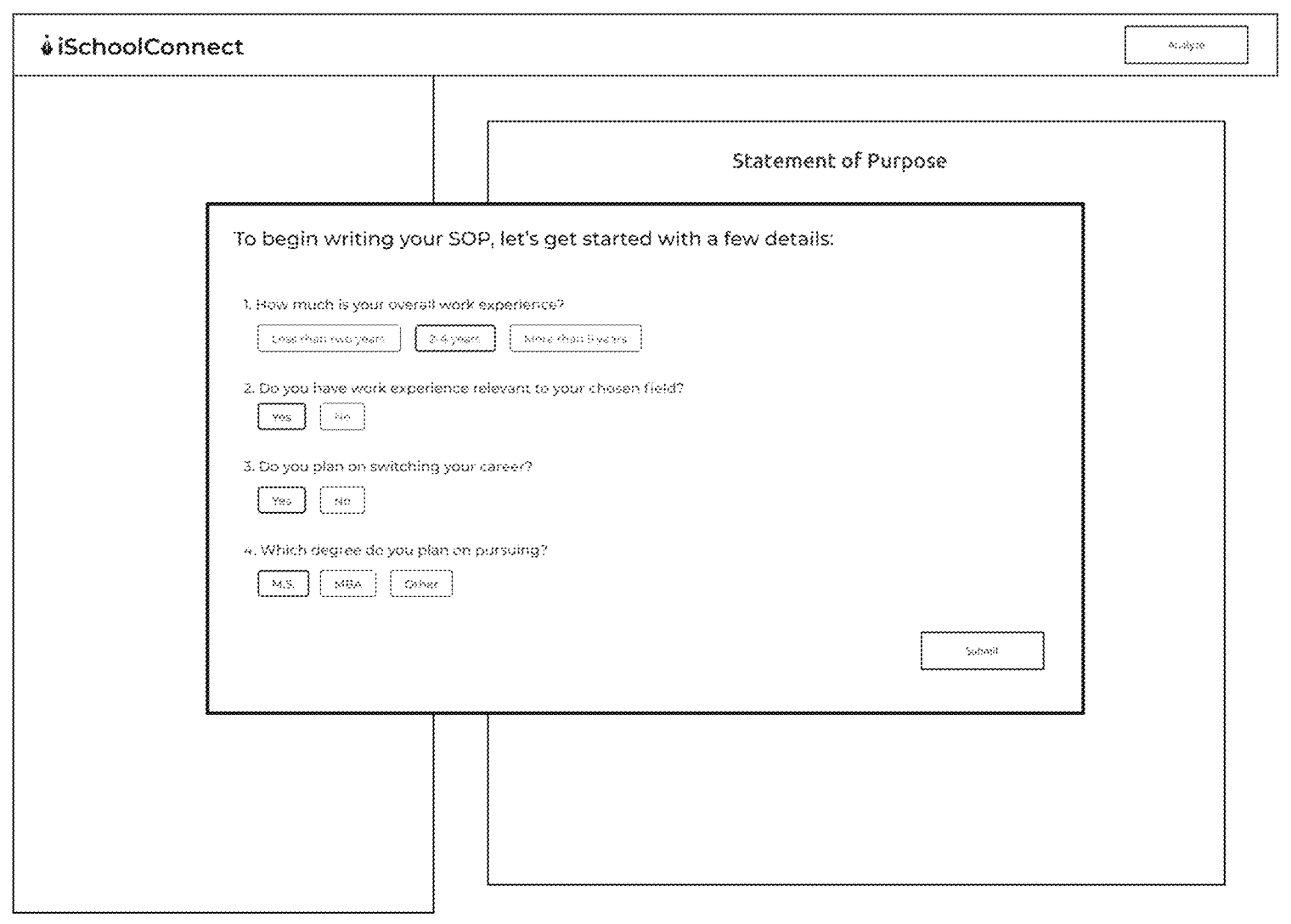

FIG. 5 shows a screenshot of an exemplary user interface demonstrating a collection of seed information.

In one embodiment, the Essay Analyzer may be configured to require initial profile information from the author through this user interface or by some other means before the Essay Analyzer performs any analysis. This step is valuable because it allows for verification of facts mentioned in the SOP and caution applicants beforehand in case of any discrepancy of such information. This information serves as the initialization for the personalized feedback provided in the advanced analysis section of the Essay Analyzer.

In other contexts, a similar user interface could be used to gather the relevant profile information, such as how technical or complex the piece should be (e.g., for a lay or specialized scientific audience).

Personalized or Specific Analysis and Feedback

The system is further enabled to make an advanced analysis through use of a Profile Analysis Processing Module 103. In the SOP context, this processing provides details on the overall SOP and the possible critical errors which an applicant might miss even after multiple revisions, and such errors often result in rejection of the applicant's application; hence it is imperative to identify and fix them as early as possible. A peer comparison-based feedback may be provided, that analyzes what other applicants with similar profiles often write in their SOP. In a peer comparison, the framework identifies similar applicants and provides feedback regarding the possible topics that the applicant can write about in their SOP. This will help them present their varied and rich experiences in a better form within their SOP.

Some of the major sections (but not limited to these) that are present in the detailed report could include:

Good Points: This section mentions all the good points that are expected in a good SOP.

Must-haves: These are some of the most important points that should be mentioned in the SOP. These include all the classes/topics which are detected by the model Feedback points: Feedback points are certain aspects that are derived from the basic topics/classes statistically. During training or initialization, the system identifies all the points that co-occur the SOP paragraphs, and after analysis and interpretation, these points were identified as good-to-have for a comprehensive SOP.

Caution messages: The system also identifies certain mistakes in SOP, which must be avoided because they could lead to a direct rejection of the application. Some instances that our system detects (but not limited to) are mistakenly replacing the name of the target university with another university or Spelling mistakes in the name of organizations, personnel, etc. mentioned in the SOP.

In the SOP context, the framework creates a persona for the applicant based on the profile of the applicant. It then compares the applicant's profile with similar applicant profiles recorded in the database, and provides feedback as per the identified persona. The system analyzes whether there is an issue with the flow in the information presented, compared to the overall flow of well-written SOPs from the database.

In one embodiment, this information is used to provide advanced feedback based on the co-occurrence of classes/labels detected in a paragraph. The co-occurrences are represented as bi/tri-gram of labels which are then sorted by frequency and the most popular 10-15 co-occurrences are then interpreted to provide automatic suggestions on how information can be presented and what additional information the author might consider including.

Figure 6:
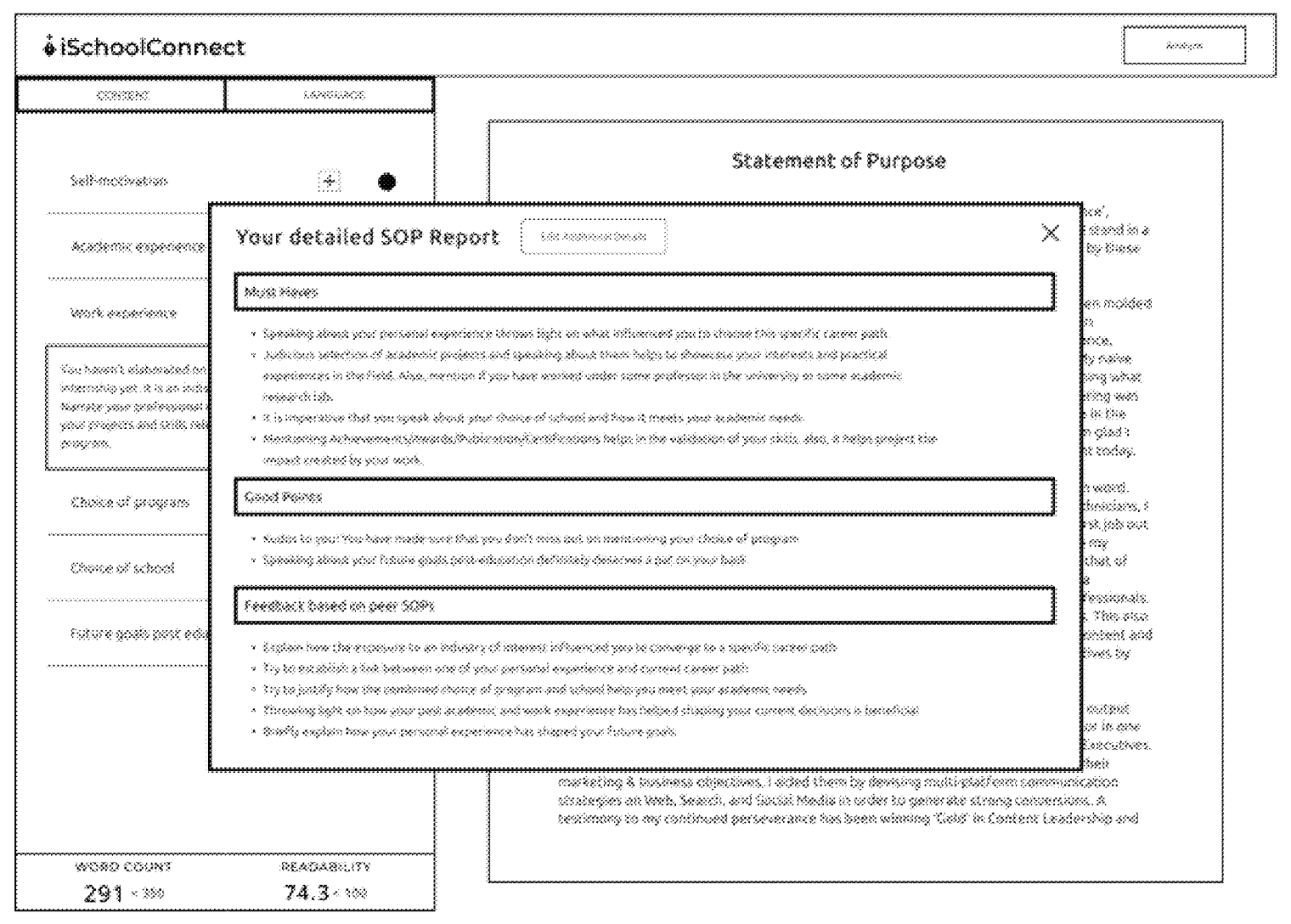

FIG. 6 shows one exemplary implementation of a user interface for the Persona Analysis Processing Module. The exemplary screenshot shows the advance analysis and peer-comparison based suggestions Essay Analyzer.

While the details of the profile and persona are herein discussed most particularly with respect to an SOP, it will be clear to one skilled in the art that the same technique applies in other contexts where customization of the essay is desirable. The essay and feedback thereon may be customized based on characteristics of the author, of the intended audience, or of the target medium.

D. Structure Analysis

The Structure Analysis Processing Module 104 focuses on how the information is presented by the author. An essay with information presented in a structured and logical order is often easy to read and understand and more engaging than an essay with information presented in an unstructured or illogical order. With structure analysis, the system identifies characteristics associated with good structure and logical order. The framework makes this assessment with the help of a Discourse Structure analysis.

Discourse Structure is a key aspect of all forms of text and provides information about the contents of a given essay. In the SOP context, an essay is expected to have sections describing various experiences of the applicant, which can be captured using Discourse Elements. Discourse Elements represent the contribution of sentences/paragraphs towards the organization of the text within an essay. Following are exemplary Discourse Elements and their functions that can be used to understand Discourse Structure in an essay such as an SOP.

PROMPT: The prompt is the essay question provided to the writer.

TITLE: The essay's title provided by the author.

INTRODUCTION: Gives background to the author's life with information about their past and/or current events. This will serve as a context creator so that the reader understands what had happened as they read through the subsequent points.

PREDICAMENT: This will be the statement(s) that states why the essay was written. It is the argument/thesis that puts forth the author's idea behind the decision to write the essay. Without the Predicament, there is no real reason for the essay to exist. The Predicament can also be recognized as a section that tells the reader what the essay will be about and can do so even in the absence of the Introduction. The brief background of the topic should link to the thesis statement introducing what, and why the essay is being written. A clear, concise, and defined thesis statement must occur in the first paragraph of the essay or the purpose of the essay will be lost to the reader.

MAIN IDEA: Statement made to back or refute the Predicament of the essay. This can be a single statement or a group of statements that put forth the key point. The body of the essay is where the author will cover your topic in depth. It often consists of three paragraphs, each dedicated to one Main Idea. A longer essay would have more than three Main Ideas discussed. This is where the author presents details of the process or idea they are explaining. It's important to make sure each paragraph covers its own clearly defined topic, introduced as a topic sentence. Different topics (all related to the overall subject matter of the essay) should be presented in a logical order, with clear transitions between paragraphs.

SUPPORTING IDEA: Provides evidence to explain or support the Main Ideas. These could be examples, further explanations, or recounts of events related to the Main Idea. These are written to support the key point made as to the Main Idea. Because the Supporting Idea is associated with a Main Idea, it cannot be tagged if the Main Idea is not. Each idea presented in a paragraph should have its own supporting ideas. Without support, the main idea may as well simply be conclusory or redundant. Due to the short duration within which these essays are sometimes required to be written, writers need not use a great deal of statistical data. But it is required that the ideas presented as evidence supporting the Main Idea of the paragraph are factual, logical, or anecdotal.

SUPPORTING CONCLUSION (or PARAGRAPH CONCLUSION): A Supporting Conclusion may be found in a few (but not all) essays. It strikes the reader as a strong conclusive end to the Main Idea's argument thus making a clean exit before discussing the next point. Identification of a Supporting Conclusion depends on and is associated with a Main Idea.

CONCLUSION: This is the definitive end of the essay, where the writer summarizes the decision/result obtained by using the Main Ideas for reasoning. A conclusion readdresses the thesis in light of the evidence discussed. Writers may struggle with the conclusion and simply leave behind a summary of the points discussed. The conclusion is the last opportunity to leave a an impression on the reader, and hence should be logical and reinforcing. It is advised to not introduce new ideas here, but simply recount, synthesize and conclude the ideas discussed in the body.

OTHERS: Statements or phrases that do not fit into the above elements and/or make no meaningful contribution. These could also include quotes, poems, stanzas, etc. that are used for added emphasis or simply increase the word count. Nevertheless, they might be meaningful, and hence cannot necessarily be discarded simply because they do not fit in.

To evaluate Discourse Structure, the Structure Analysis Processing Module uses tags that indicate which parts of an essay constitute which Discourse Elements. Discourse Structure Tagging in an essay is formulated as a sequence labeling problem. A Conditional Random Field (CRF) model is trained using discourse features (explained in more detail below), which returns a model with a weight between the transition states (i.e., positive and negative weights). Similarly, a Hidden Markov Model (HMM) is also trained which returns weights that are probability to make a particular transition.

To classify discourse elements, the instant invention performs a feature selection process prior to model training with the following features:

1) Paragraph Embeddings: These are dense representations of paragraphs.
2) Bag of Words: Classwise token level features indicating the presence of a particular word in the essay.
3) Term Frequency and Inverse Document Frequency (TF-IDF): Feature to penalize words that are not meaningful or used too frequently.
4) Previous Paragraph Label: Predicted label of previous paragraph.
5) Positional Features: Position of given paragraph in the essay, such as introduction, body, or conclusion.
6) Lexical Features:
    a) Transition Words: Proportion of various kind of transition words.
    b) Verbs: Proportion of verbs used in the paragraph.
    c) Objects: Proportion of objects used in the paragraph.
7) Cohesion Features:
    a) Identity Chains: Find identities based on POS/NE tags. Perform a pronoun resolution for these entities within the same paragraph, an identity and all its anaphora together form an identity chain.
    b) Lexical Chains: Lexical cohesion is referred to relations between text using lexical repetition, synonymy or near synonymy.
    c) Local Chains: Local chains are identity/lexical between sentences of same paragraph. Coreference within a sentence may be disregarded.
    d) Global Chains: Global chains are identity/lexical chains between sentences across paragraphs.
    e) Chain interactions: Two chains interact with each other if they have one or more sentences in common.
        i) Global Interaction: If two chains which interact are both global chains.
        ii) Local Interaction: If two chains which interact are both local chains.
    f) Cohesion Strength Features: These features are based on how many chains a particular sentence or paragraph is involved with.

g) Prompt Adherence Feature:
  i) Prompt Similarity: Measures the similarity between the essay prompt versus sentences and paragraphs.
  ii) Title Similarity: Measures the similarity between the essay title versus sentences and paragraphs.
  iii) Prompt-Title Similarity: Measures the similarity between the essay title versus the essay prompt.

The foregoing list of features is exemplary. As one of ordinary skill in the art will recognize, some of these features may be omitted and others added and analyzed without departing from the spirit and scope of this invention.

In another embodiment of the Structure Analysis Processing Module Discourse Element tags may be associated with one another. For example, a Supporting Idea is associated with the prior element that it logically supports. In one implementation, each Main Idea, Supporting Idea, and Supporting or Paragraph Conclusion is indexed and each subsequent Supporting Idea and Supporting or Paragraph Conclusion refers back to the preceding element that it supports.

Tags used for this purpose may take the form of MAIN_IDEA_'x', where 'x' reflects the order in which the Main Ideas are written. The first Main Idea will be marked as MAIN_IDEA_1, the third Main idea which will be marked as MAIN_IDEA_3, etc.

A statement written after the Main Idea and identified as a Supporting Idea must link to a particular Main Idea and will be tagged to show that link. For example, a tag in the format of SUPPORTING_IDEA_'y' |MAIN_IDEA_'x', may be used where the 'x' stands for the number of the Main Idea under which the Supporting Idea is being written. The 'y' stands for the order in which the Supporting Idea has been written. In other words, the $y^{th}$ Supporting Idea supports the $x^{th}$ Main Idea. For example, the first supporting idea under MAIN_IDEA_1 will be marked as SUPPORTING_IDEA_1|MAIN_IDEA_1 and the third supporting idea under MAIN_IDEA_2 will be marked as SUPPORTING_IDEA_3|MAIN_IDEA_2.

Some Supporting Ideas may not relate to the Main Idea directly but support a preceding Supporting Idea. This means that they might not have a link to the Main Idea, but are linked to the previous Supporting Idea. Supporting Ideas may also be tagged to show that link. In SUPPORTING_IDEA_'z'|SUPPORTING_IDEA_'y', the 'y' stands for the number of the previous Supporting Idea after which the current supporting idea is being written and supports. The 'z' stands for the order in which the supported Supporting Idea has been written. Hence, the Supporting Idea after and linked to SUPPORTING_IDEA_3 will be marked as SUPPORTING_IDEA_4|SUPPORTING_IDEA_3. Similarly, the sixth supporting idea after and linked to SUPPORTING_IDEA_5 will be marked as SUPPORTING_IDEA_6|SUPPORTING_IDEA_5.

A similar approach may be used for a Paragraph Conclusion. For example, PARA_CONCLUSION_2|MAIN_IDEA_3, indicates the Paragraph Conclusion associated with the paragraph addressing MAIN_IDEA_3.

Figure 7:
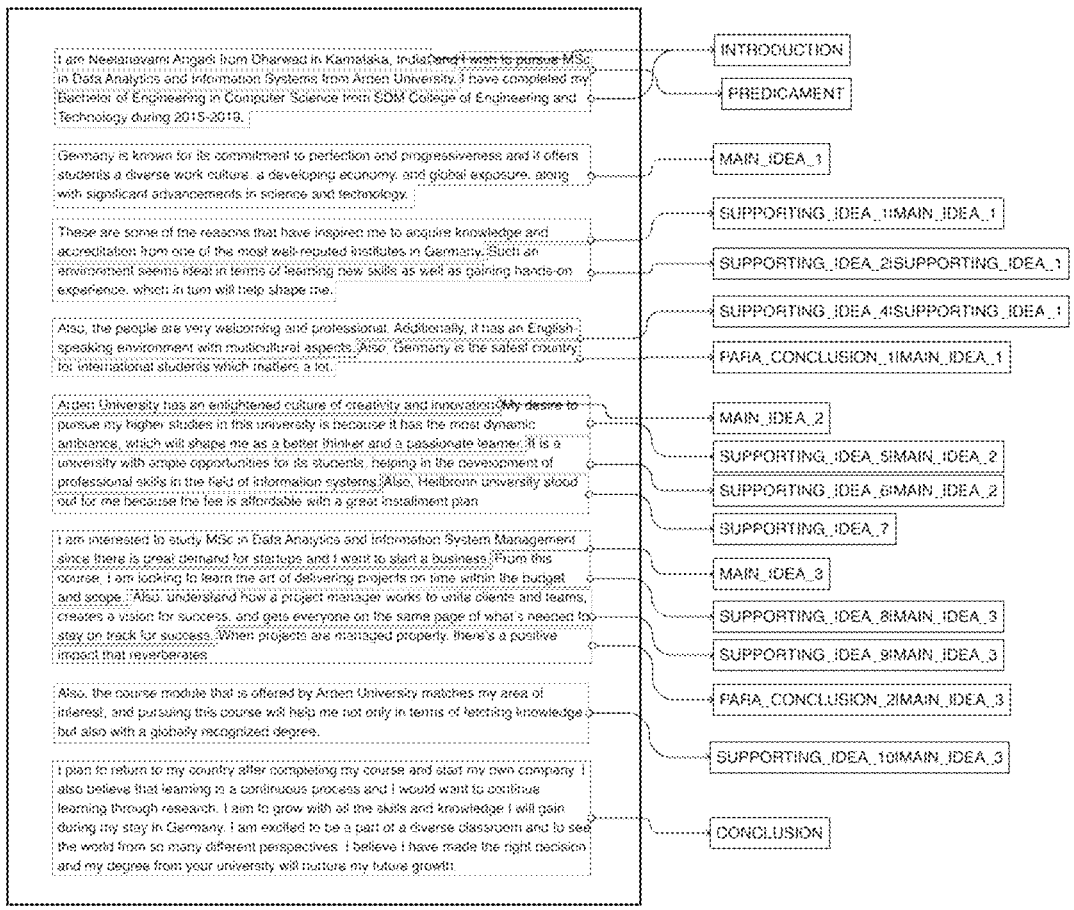
FIG. 7 illustrates discourse elements identified within a poor or substandard essay.

FIG. 7 illustrates a poor or substandard essay that has been tagged with Discourse Elements. As can be seen from the notations, the first paragraph contains an INTRODUCTION split by the PREDICAMENT. The second paragraph contains the first Main Idea, MAIN_IDEA_1. The third paragraph contains two Supporting Ideas, one supporting the first Main Idea (SUPPORTING_IDEA_1|MAIN_IDEA_1) and the second supporting the first (SUPPORTING_IDEA_2|SUPPORTING_IDEA_1). The fourth paragraph contains a another Supporting Idea referring back to the first Supporting Idea (SUPPORTING_IDEA_3|SUPPORTING_IDEA_1) and concludes with a Paragraph Conclusion referring back to the first Main Idea (PARA_CONCLUSION_1|MAIN_IDEA_1). The remainder of the essay comprises two additional Main Ideas and Supporting Ideas referring back, or in the case of SUPPORTING_IDEA_7 not referring back to a prior element. The final paragraph contains a CONCLUSION.

Figure 8:
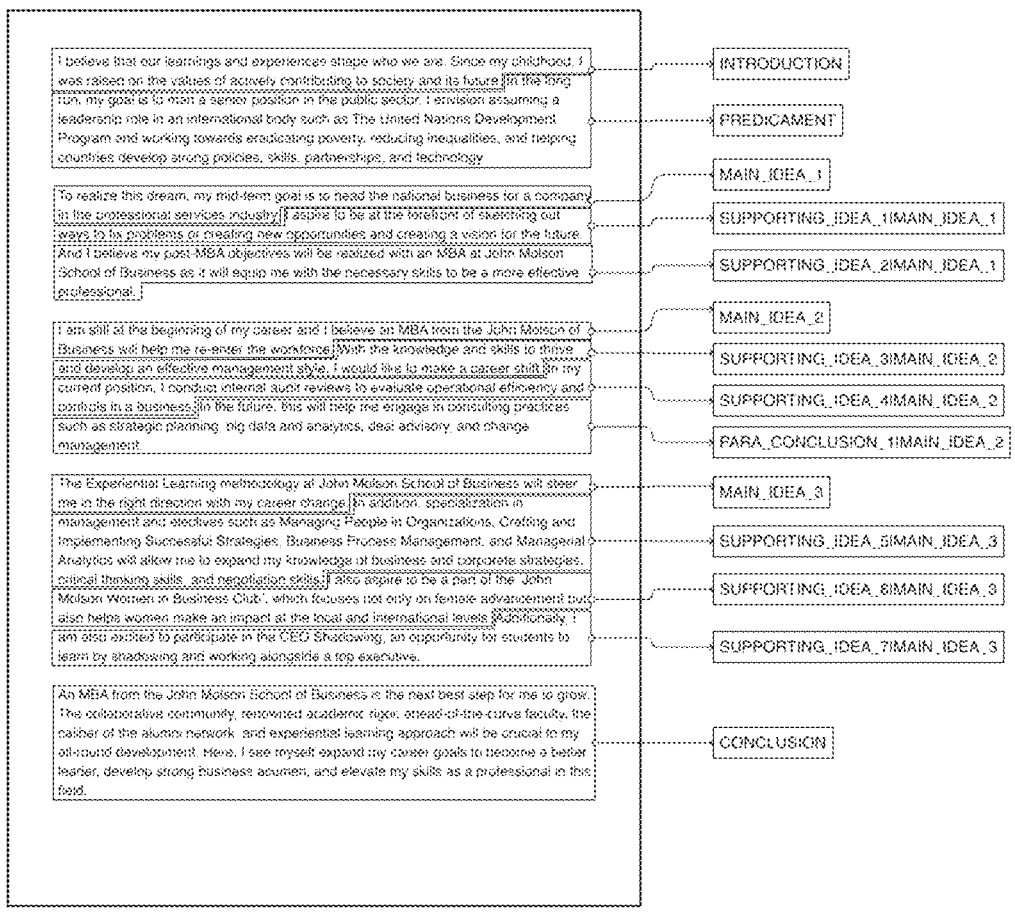
FIG. 8 illustrates discourse elements identified within a good or above average essay.

FIG. 8 illustrates a good essay that has been tagged with Discourse Elements. As can be seen from the notations, this essay contains a logical flow as follows: INTRODUCTION, PREDICAMENT, MAIN_IDEA_1 (with two associated Supporting Ideas), MAIN_IDEA_2 (with two associated Supporting Ideas and a Paragraph Conclusion), MAIN_IDEA_3 (with three associated Supporting Ideas), and finally, a CONCLUSION.

In one embodiment of the instant invention, the Discourse Structure may be evaluated and scored with a Discourse Structure Matrix (DSM). A Discourse Structure Matrix contains a score for each possible transition from one Discourse Element to another Discourse Element.

FIG. 9 illustrates an exemplary Discourse Structure Matrix, which is a matrix between the various transitions possible in an essay such as an SOP. Each Discourse Element appears as a label twice, once at the left, signifying the Discourse Element associated with the text preceding a transition, and again at the top, signifying the Discourse Element associated with the text following a transition. Thus, each value in the matrix represents a particular type of transition. The numbers in the matrix reflect the value or desirability of the associated transition. For example, DSM (TITLE)(INTRODUCTION) reflects the value of a transition from TITLE to INTRODUCTION. Weights within the DSM may be assigned by an analysis of similar essays, both good and bad. The system may learn which sequences of annotations and labels are associated with and represent a well-structured essay and those that are associated with and represent an average or substandard essay. The values in the table, while important in reference to each other, may be scaled arbitrarily or may represent probabilities depending on the model from which these transition weights are obtained.

A Discourse Structure Score (DSS) may be derived from the DSM and a Transition Matrix (TM), which reflects the presence of certain kinds of transitions. The Transition Matrix is an M×M matrix where M is the total number of Discourse Elements. For each transition detected in the essay, the corresponding element is updated to reflect the presence of that transition. In one embodiment, a transition is present when $$TM[\text{Transition\_From}][\text{Transition\_To}] = 1$$

otherwise $$TM[\text{Transition\_From}][\text{Transition\_To}] = 0$$

In an exemplary embodiment, DSS is calculated as a summation of Hadamard product of the DSM and TM matrices.

$$DSS = \sum \sum DSM \odot TM$$

E. Language Analysis

Simultaneously, the language used by the author within the essay text is analyzed using a Language Analysis Processing Module 105 that fetches the paragraphs from the database and processes them to detect some of the most common mistakes made while writing an essay. This process may help avoid a lengthy version of the essay riddled with grammatical mistakes, which results in an ineffective and unconvincing product. Within the Language Processing Model, detection of mistakes may be implemented in logic algorithms built on top of the language model.

In the SOP and similar contexts, the language analysis processing module may detect such mistakes as:

---

Grammar: Under grammar check following (but not limited to these) are some of the checks that the Essay Analyzer performs:
- Absolute Statement
- Article Errors
- Verb Errors
  - "To Be" Verbs
  - Weak Verbs
  - Overusing expletives
- "It + Be" Verb
- "There + Be" Verb
  - Coordinating Conjunction
  - Effectiveness
  - Logical Confusion
  - NOT Problem
  - Semicolon
  - Subjunctive
  - Unclear Pronouns
  - Unparalleled Structure
  - Verbose
  - Contractions Gerund Detection: Root verb should not be in gerund form in a sentence until and unless there is an auxiliary verb present in the same sentence.

Contraction Detection: A contraction is made by shortening or combining two words. Contractions should be avoided in formal documents for example in essays for higher education.

Antecedent Detection: This detects the problems related to unclear pronouns. A pronoun (it, this, that, they, them., etc.) unclearly refers to the prior content. For example, the first sentence contains two singular nouns, so the usage of "it" in the second sentence can refer to either of them. If for a pronoun, the system can detect the referenced noun, it is considered as properly used, otherwise, if there is a pronoun whose noun cannot be found, it is marked as a dangling pronoun and the user is prompted to correct it.

Word Count: Total word count in the SOP is displayed since each admission application has a different word limit requirement.

Long Paragraph Identification: The system identifies paragraphs that exceed a recommended range. The range may be derived by performing statistical analysis on a dataset of similar essays. Hence, if a paragraph length exceeds this recommended range, it is flagged to the author, who could then re-edit and shorten the paragraph length.

Long Sentence Identification: The system identifies sentences that exceed a recommended range. The range may be derived by performing statistical analysis on a dataset of similar essays. Hence, if the sentence length exceeds this range, they are flagged to the author as a long sentence and could be shortened during editing.

Voice: Identify if a sentence has been written in the active or passive voice. The use of passive voice often clouds clarity; hence it should be avoided in most SOP writing.

Readability Score: This score helps give an idea about the ease of reading of the text.

---

Figure 10:
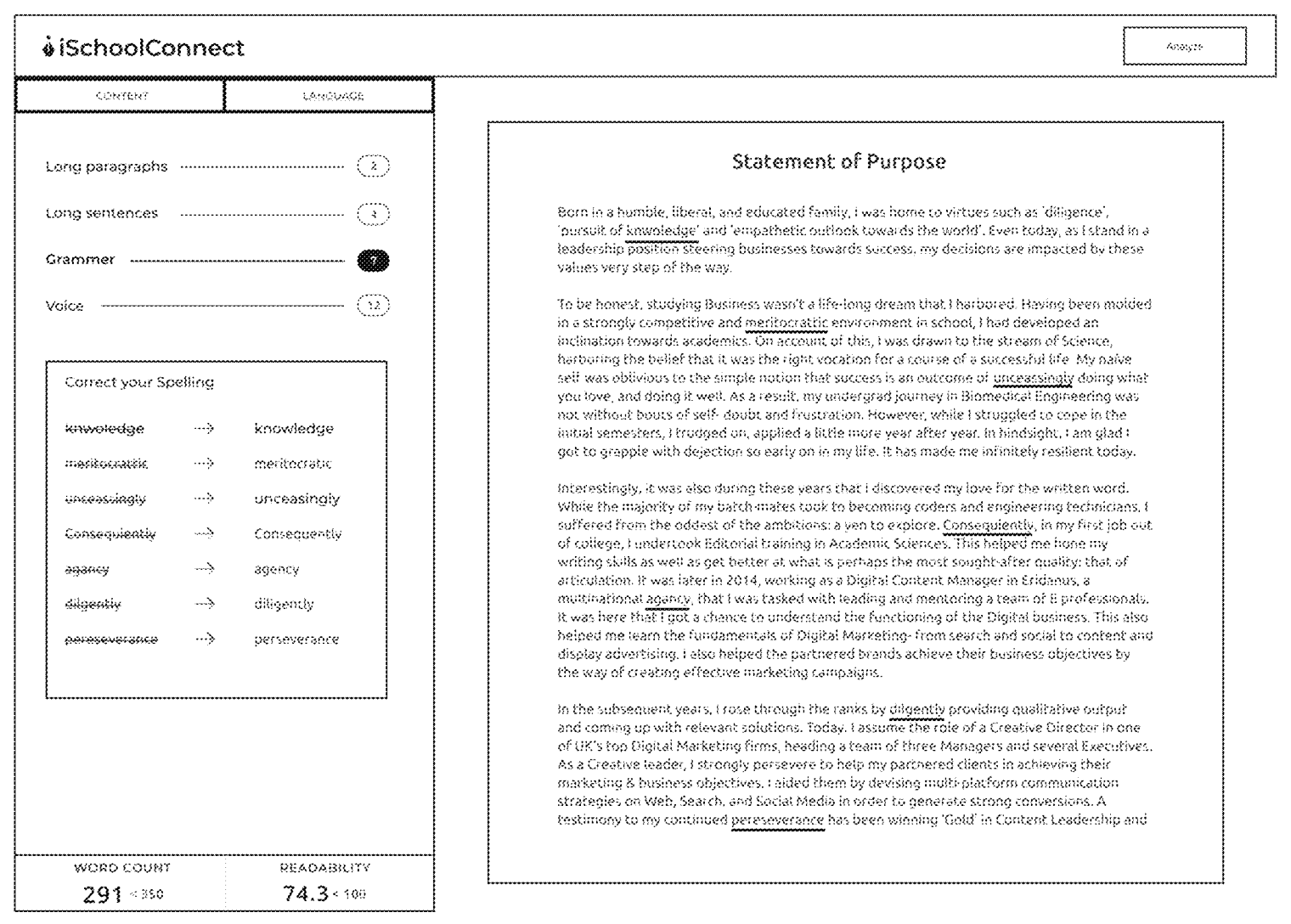

FIG. 10 shows one exemplary implementation of a user interface for the language analysis module. The exemplary screenshot provides feedback on the above metrics. The Content Analysis processing modules and Language Analysis processing module provide immediate feedback while writing the SOP.

F. Other Aspects of the Essay Analyzer

1. Comparative Analysis of Essay Composition

Any given essay may be compared to all essays in the system via a score, which may be essentially a sum of a Content Score, a Discourse Structure Score, and a Language Core. Essay composition is calculated for each topic by running a machine learning model across thousands of essays.

2. Interactive Tool and Human Review

The author may interact with the Essay Analyzer and perform preliminary editing until they have made most of the suggested edits from the Essay Analyzer. Once the author is satisfied with their editing, the essay may be finalized, or alternatively and optionally, sent to a human Expert to perform further human-level analysis of the essay and provide feedback. In this use case, the applicant may be notified of the suggested changes and decide which of them to make.

3. Model Training a. Data Collection

To effectively train the various models of the Essay Analyzer, essays (or other written product) must be collected and processed. In the SOP context, essays from various sources may be considered. Example essays may be obtained from proprietary sources or scraped from publicly available sources. After the Essay Analyzer is implemented, essays from users may be collated, subject to user consent and protection of personally identifiable information.

b. Data Preparation

In one embodiment, essay data collected from the foregoing sources may be stored in JavaScript Object Notation (JSON) format in databases specifically prepared for training. Essays may be advantageously divided them into multiple paragraphs which are then stored separately but marked in such a way that they can be recollected to generate the entire essays. Storing and working at the paragraph level is a design decision and essays may also be stored in other ways. However, in most instances, a paragraph is self-contained and independently meaningful because it addresses one or at most two topics or classes which are similar to each other. For these reasons, feedback to the author may be advantageously given at paragraph level to help the author write well-developed content.

c. Data Tagging

In one embodiment, the essay paragraphs in are tagged by human reviewers with a multi-label tagging strategy. Each label is a binary indication of whether a certain class is present in or absent from the tagged paragraph of the essay. As described above, six useful classes have been found useful in the education context. A quality control step may be employed to ensure consistent tagging, in which the tagging decisions of each tagger are compared to the overall average performance. Reviewers who deviate from the average in a statistically significant way may be further examined, and trained if necessary, or their input disregarded.

Sentences are selected from each paragraph, which the tagger finds relevant to different classes as tagged in the multi-label tagging strategy. These sentences are then used to create a lexicon specific to different labels. Tagging is advantageously done at clause level to annotate only the relevant parts of a sentence or paragraph. Tagging in this manner helps limit the lexical vocabulary to have only relevant words to a particular topic.

G. Implementation

The Essay Analyzer itself and associated training methods may be implemented on a variety of computing platforms. The invention may advantageously be run on a cloud computer platform such as those available from third parties such as Amazon (AWS) or Google (GCP, Firebase) or a custom and proprietary platform.

Figure 11:
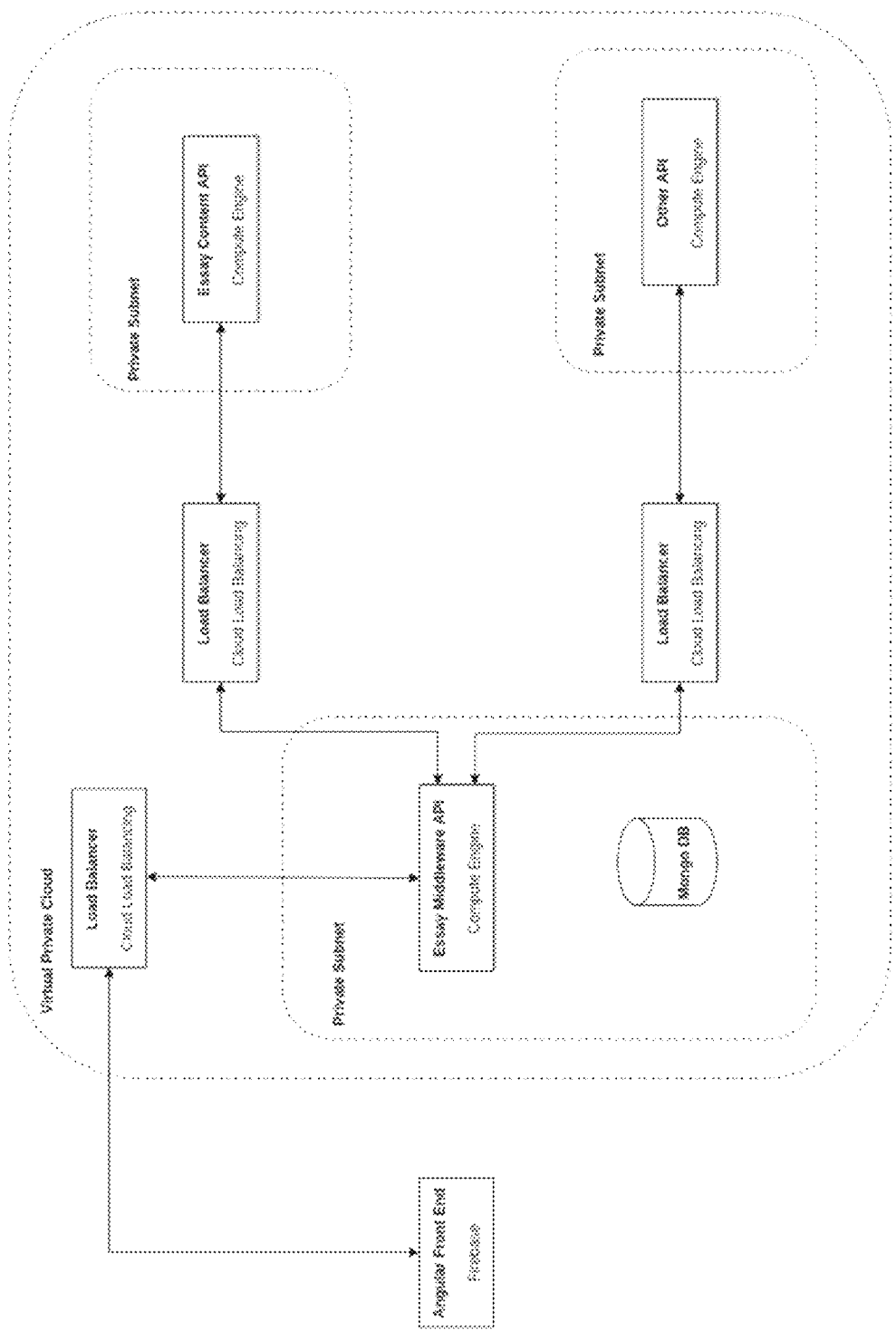
FIG. 11 is a block diagram of an exemplary implementation of the invention.
Figure 12:
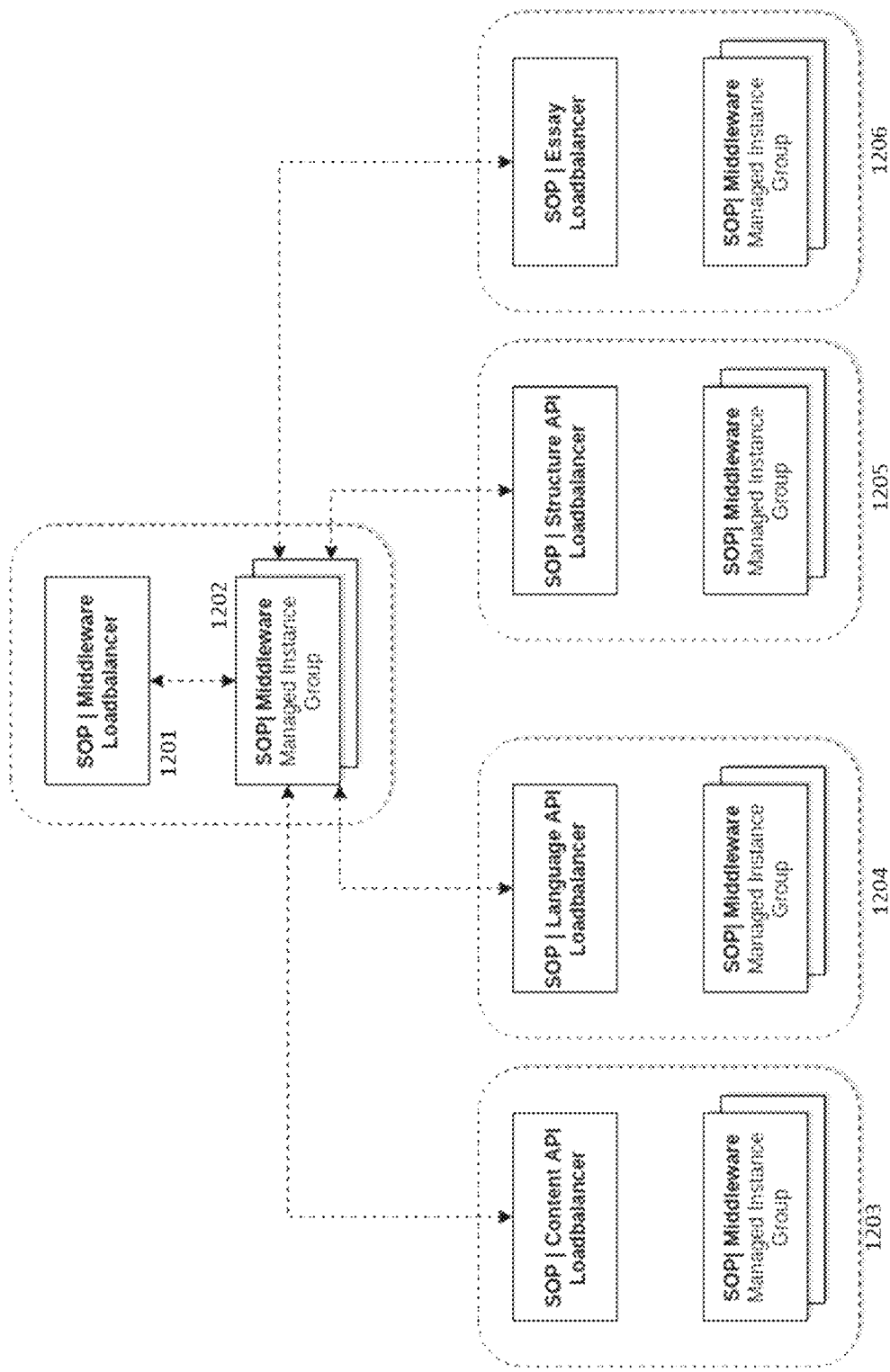
FIG. 12 shows an exemplary high level architecture implementation of one embodiment of the invention.
Figure 13:
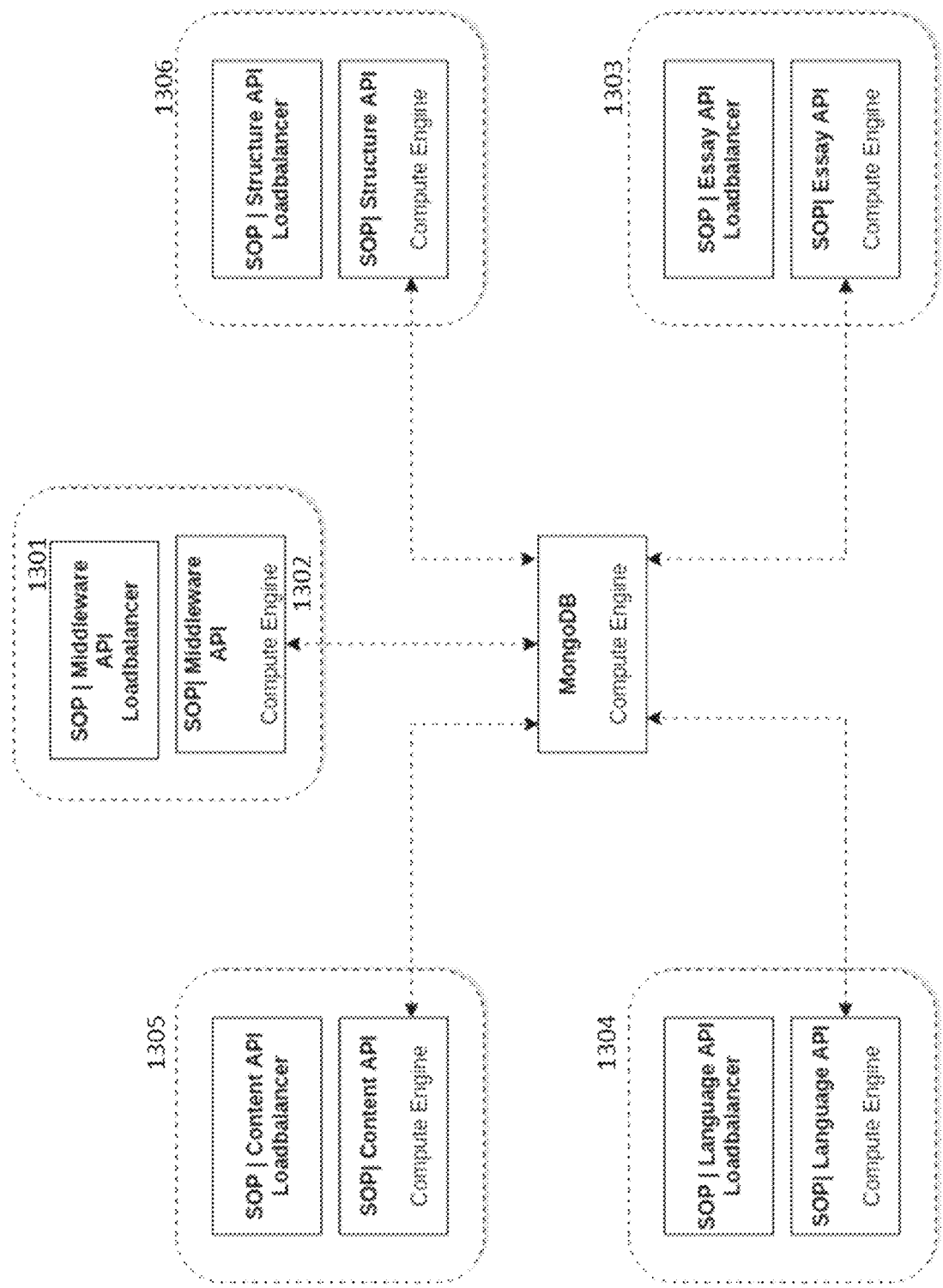
FIG. 13 shows an exemplary low level architecture implementation of one embodiment of the invention.

FIGS. 11-13 depict a representative implementation of the Essay Analyzer. FIG. 11 is a block diagram showing the front end and how data is passed between processing components. In an exemplary web-based system, an Angular Front End may be hosted on Firebase. All Application Programming Interfaces (APIs) are hosted on instance groups and enclosed in private subnets inside a Virtual Private Cloud (VPC). Load Balancers are used to communicate between the front end and the various APIs. Mongo DB is used for storing the data and it is enclosed in the private subnet along with SOP Middleware API.

SOP Middleware handles the communication between the front end and machine learning components. It consists of business logic that handles all the user requests and routes the call to machine learning APIs for language analysis, content analysis, structure analysis and advanced reports. It is also responsible for collecting user feedback for continuous product improvement.

All the underlying APIs are deployed as docker containers which help the DWM is deployed as a distributed system that provides the option to scale both vertically and horizontally. All the APIs are put behind load balancers which control the rate at which requests are sent to the underlying APIs, routing requests and new instance spin-up. Alternatively, the entire system could be orchestrated using systems like Kubernetes or similar alternative docker orchestration services.

As an option for saving resources and components reuse, the language model could be deployed as a separate service that could be used to generate word/sentence representations consistently across various machine learning components without the need to separately integrate with their own APIs which makes the system difficult to scale and costlier.

FIG. 12 shows an exemplary high level architecture implementation of one embodiment of the invention. A middleware load balancer 1201 controls input to a middleware managed instance group 1202, which in turn communicates with the Content Analysis Processing Module API 1203, Language Analysis API 1204, Structure Analysis API 1205, and Content Analysis (or "Essay") API 1206, each mediated with its own load balancer. In the architecture depicted in FIG. 12, the Personal Analysis Processing Module is not implemented on its own server.

FIG. 13 shows an exemplary low level architecture implementation of one embodiment of the invention. A middleware load balancer 1301 controls input to a middleware compute engine 1302, which in turn communicates with each of the Content API 1303, Language API 1304, Content Analysis (or "Essay") API 1305, and Structure Analysis API 1306, each mediated with its own load balancer. In the architecture depicted in FIG. 13, the Personal Analysis Processing Module is not implemented on its own server.

To promote an understanding of the principles of the invention, reference has been made to the embodiments illustrated in the figures, and specific language used to describe them. It will nevertheless be understood that alterations and further modifications in the illustrated system as would normally occur to those skilled in the art are to be construed as being within the scope of the present invention. It will be understood by those skilled in the art that the foregoing general and detailed descriptions are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures, or additional components. Appearances of the phrase "in an embodiment," "in another embodiment" and similar language throughout this specification may, but not necessarily do, all refer to the same embodiment.

What is claimed is:

1. A system, comprising:
one or more computing devices configured to:
receive a block of text comprising an essay organized as a series of sentences within a series of one or more paragraphs;
inventory content within the essay by:
dividing the essay into a plurality of text portions;
classifying each text portion of the plurality of text portions as one of a plurality of content classes by applying the essay and plurality of text portions to a language model and applying the output of the language model to a multi-label classifier machine learning model; and
determining, for each content class in the plurality of content classes, a value associated with that content class;

assess a quality of discourse structure within the essay by:
  classifying each sentence within the series of sentences as one of a plurality of discourse elements by applying the essay to one or more sequence labeling machine learning models; and
  identifying a type of transition associated with a transition from one discourse element to a different discourse element within the series of sentences;
assess a quality of language usage within the essay; and
provide normative feedback relating to the plurality of values associated with the plurality of content classes, the quality of discourse structure, and the quality of language usage.

2. The system of claim 1 wherein the one or more computing devices is or are further configured to:
  receive a profile containing information describing one or more characteristics of a subject of the essay;
  determine a plurality of topics relating to the one or more characteristics of the subject of the essay;
  detect the presence or absence of each one of the plurality of topics within the essay; and
  provide feedback regarding one or more of the plurality of topics that are absent from essay.

3. The system of claim 1 wherein the multi-label classifier machine learning model comprises a deep learning multi-class, multi-label classifier model to the essay.

4. The system of claim 3 wherein the deep learning multi-class, multi-label classifier model has been constructed from a one-versus-rest classifier and multi-label classifier.

5. The system of claim 4 wherein each of the one-versus-rest classifier and multi-label classifier have been trained using a fine-tuned language model.

6. The system of claim 5 wherein the fine-tuned language model has been trained using a transfer learning approach, wherein a language model is pre-trained on a general purpose training and said language model is then fine-tuned on a special purpose training set.

7. The system of claim 1 wherein normative feedback relating to the plurality of values associated with the plurality of content classes comprises information regarding a content class that is either over-represented or under-represented within the essay.

8. The system of claim 1 wherein the normative feedback regarding a quality of discourse structure within the essay comprises information relating to the type of transition.

9. The system of claim 1 wherein the one or more computing devices is further configured to assess a quality of language usage within the essay by employing a language model and logic algorithms to detect grammatical and syntactic errors in the output of said language model.

10. A computer-implemented method comprising the steps of:
  receiving a block of text comprising an essay organized as a series of sentences within a series of one or more paragraphs;
  inventorying content within the essay by:
    dividing the essay into a plurality of text portions;
    classifying each text portion of the plurality of text portions as one of a plurality of content classes by applying the essay and plurality of text portions to a language model and applying the output of the language model to a multi-label classifier machine learning model; and
    determining, for each content class in the plurality of content classes, a value associated with that content class;
  assessing a quality of discourse structure within the essay by:
    classifying each sentence within the series of sentences as one of a plurality of discourse elements by applying the essay to one or more sequence labeling machine learning models; and
    identifying a type of transition associated with a transition from one discourse element to a different discourse element within the series of sentences;
  assessing a quality of language usage within the essay; and
  providing normative feedback relating to the plurality of values associated with the plurality of content classes, the quality of discourse structure, and the quality of language usage.

11. The method of claim 10 further comprising the steps of:
  receiving a profile containing information describing one or more characteristics of a subject of the essay;
  determining a plurality of topics relating to the one or more characteristics of the subject of the essay;
  detecting the presence or absence of each one of the plurality of topics within the essay; and
  providing feedback regarding one or more of the plurality of topics that are absent from the essay.

12. The method of claim 10 wherein the step of providing normative feedback relating to the plurality of values associated with the plurality of content classes further comprises providing information regarding a content class that is either over-represented or under-represented within the essay.

13. The method of claim 10 wherein the step of providing normative feedback regarding a quality of discourse structure within the essay further comprises providing information relating to the type of transition.

14. The method of claim 10 wherein step of assessing a quality of language usage within the essay further comprises employing a language model and logic algorithms to detect grammatical and syntactic errors in the output of said language model.

15. A non-transitory computer-accessible storage medium storing program instructions that when executed on one or more processors of a machine learning system, cause the machine learning system to:
  receive a block of text comprising an essay organized as a series of sentences within a series of one or more paragraphs;
  inventory content within the essay by:
    dividing the essay into a plurality of text portions;
    classifying each text portion of the plurality of text portions as one of a plurality of content classes by applying the essay and plurality of text portions to a language model and applying the output of the language model to a multi-label classifier machine learning model; and
    determining, for each content class in the plurality of content classes, a value associated with that content class;
  assess a quality of discourse structure within the essay by:
    classifying each sentence within the series of sentences as one of a plurality of discourse elements by applying the essay to one or more sequence labeling machine learning models; and identifying a type of transition associated with a transition from one discourse element to a different discourse element within the series of sentences;

assess a quality of language usage within the essay; and provide normative feedback relating to the plurality of values associated with the plurality of content classes, the quality of discourse structure, and the quality of language usage.

16. The non-transitory computer-accessible storage medium of claim 15, wherein program instructions that when executed on one or more processors of a machine learning system further cause the machine learning system to:

receive a profile containing information describing one or more characteristics of a subject of the essay;

determine a plurality of topics relating to the one or more characteristics of the subject of the essay;

detect the presence or absence of each one of the plurality of topics within the essay; and provide feedback regarding one or more of the plurality of topics that are absent from the essay.

17. The system of claim 15 wherein the multi-label classifier machine learning model comprises a deep learning multi-class, multi-label classifier model to the essay.

18. The system of claim 17 wherein the deep learning multi-class, multi-label classifier model has been constructed from a one-versus-rest classifier and multi-label classifier.

19. The system of claim 18 wherein each of the one-versus-rest classifier and multi-label classifier have been trained using a fine-tuned language model.

20. The system of claim 19 wherein the fine-tuned language model has been trained using a transfer learning approach, wherein a language model is pre-trained on a general purpose training and said language model is then fine-tuned on a special purpose training set.

* * * * *